US012691995B2

(12) United States Patent
Schlipf et al.

(10) Patent No.: US 12,691,995 B2
(45) Date of Patent: Jul. 28, 2026

(54) WING FOR AN AIRCRAFT AND METHOD OF CONNECTION OF A CONNECTION ASSEMBLY

(71) Applicant: Airbus Operations GmbH, Hamburg (DE)

(72) Inventors: Bernhard Schlipf, Hamburg (DE); Dennis Krey, Hamburg (DE); Steffen KLEEMIß, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 2 days.

(21) Appl. No.: 19/071,205

(22) Filed: Mar. 5, 2025

(65) Prior Publication Data

US 2025/0282469 A1 Sep. 11, 2025

(30) Foreign Application Priority Data

Mar. 8, 2024 (EP) ..................................... 24162373

(51) Int. Cl.
*B64C 3/44* (2006.01)
*B64C 3/16* (2006.01)
(52) U.S. Cl.
CPC . *B64C 3/44* (2013.01); *B64C 3/16* (2013.01)
(58) Field of Classification Search
CPC ..................................... B64C 3/44; B64C 3/16
See application file for complete search history.

(56) References Cited

U.S. PATENT DOCUMENTS

| | | | |
|---|---|---|---|
| 2013/0334363 A1* | 12/2013 | Lam | B64C 9/16 |
| | | | 244/99.3 |
| 2018/0281927 A1 | 10/2018 | Schlipf et al. | |
| 2020/0023937 A1* | 1/2020 | Everaert | B64C 5/10 |
| 2020/0290722 A1* | 9/2020 | Tsai | B64C 9/02 |
| 2022/0081102 A1* | 3/2022 | Tsai | B64C 13/32 |
| 2022/0388629 A1 | 12/2022 | Schlipf et al. | |

OTHER PUBLICATIONS

European Search Report for corresponding European Patent Application No. 24162373.5 dated Aug. 30, 2024.

* cited by examiner

*Primary Examiner* — Valentina Xavier
(74) *Attorney, Agent, or Firm* — Greer, Burns & Crain, Ltd.

(57) ABSTRACT

An aircraft wing includes a main wing and a high lift assembly which includes a high lift body and a connection assembly movably connecting the high lift body to the main wing, such that the high lift body is movable between retracted and extended positions. The connection assembly includes primary and secondary connectors mountable to and engageable with the main wing via primary and secondary mount profiles, respectively. The primary connector is rotatable relative to the primary mount profile and at least one of the connection assembly and the main wing to configure the primary connector and mount profile between a decoupled configuration in which the primary connector may be moved into so as to be engaged with, and removed from so as to be disengaged from, the primary mount profile, and a locked configuration wherein movement between the primary mount profile and the secondary mount profile is restricted.

15 Claims, 10 Drawing Sheets

WING FOR AN AIRCRAFT AND METHOD OF CONNECTION OF A CONNECTION ASSEMBLY

CROSS-REFERENCES TO RELATED APPLICATIONS

This application claims the benefit of European Patent Application Number 24162373.5 filed on Mar. 8, 2024, the entire disclosure of which is incorporated herein by way of reference.

FIELD OF THE INVENTION

The present invention relates to a wing for an aircraft, a method for connecting a connection assembly to a wing for an aircraft, and an aircraft comprising a wing for an aircraft.

BACKGROUND OF THE INVENTION

The described wing for an aircraft comprises a main wing and a high lift assembly, the high lift assembly comprising a high lift body and a connection assembly movably connecting the high lift body to the main wing such that the high lift body is movable between a retracted position and at least one extended position (e.g., movable relative to the main wing). To enable movement of the high lift body between the extended and retracted position, the high lift body may comprise a slat track and a roller bearing that movably connects the high lift body to the main wing. The slat track may comprise a slat track axis extending along the length thereof, such that the slat track is movable along the slat track axis via the roller bearing. The high lift body may be or comprise a leading edge slat or a trailing edge flap of a wing for an aircraft.

The connectors of the connection assembly are mounted to the main wing via a primary mount profile and a secondary mount profile. The primary connector is configurable to engage the primary mount profile and the secondary connector is configured to engage the secondary mount profile.

Wings for aircraft generally have connection assemblies that movably connect a high lift body to the main wing, for example so as to allow the high lift body to move between the extended and retracted position. The connection assembly in the wing of an aircraft may be supported by the wing box of the aircraft and connected to the wing box via an interface. The wing box provides structural support to the wing of the aircraft, and often comprises or defines a rib structure at the forward leading edge of the wing externally of the wing box itself, which may be used to carry leading edge devices such as slats, which may be operated and supported via a connection assembly.

The connection assembly may usually be assembled with the wing box of the wing for an aircraft. During assembly, the connection assembly is connected to the wing box via an interface that may be toleranced and configured so as to ensure a desired alignment of the wing box and the connection assembly. The alignment between the wing box and the connection assembly is important since this will also determine the orientation of the high lift body relative to the main wing. The installation of a connection assembly to the main wing is therefore a task which requires a high degree of precision. Installation of the connection assembly may be done during assembly of the wing box, meaning that the wing box and the connection assembly may be assembled together so as to set a desired orientation of the connection assembly relative to the wing box.

It is desirable to modularize the process of constructing an aircraft, for example to improve efficiency in the process of constructing the aircraft and/or to automate some steps involved in the construction of an aircraft. Modularization can also have the advantage that repair and replacement of parts is easier, as individual parts (e.g., modules) of the aircraft may be taken from the aircraft, and replaced with an identical module that does not need any replacement work, as well as permitting smaller modules to be assembled quickly and easily by a single worker, or a small number of workers. This would then allow the part that needs repair to be repaired on the ground without the rest of the aircraft also having to remain grounded with it, this greatly reducing the grounding times of the aircraft. However, in the case of the connection assembly, the high degree of precision required means that separating the construction of the wing box from the placement of the connection assembly into discreet steps would render sufficiently accurate placement of the connection assembly impossible, since it would have to be attached to a previously constructed wing box, with which there no longer existed the freedom to adjust the relative position of certain components thereof.

SUMMARY OF THE INVENTION

It is therefore an object of the invention to provide a wing assembly and a method for connecting a high lift assembly to the wing of an aircraft that is simple and may be carried out by relatively few personnel and that facilitates modular construction of the wing of an aircraft. It is further an object of the invention to permit such a simple and modular construction while being able to accurately orient the high lift assembly (and the connection assembly thereof) relative to the main wing.

The object of the invention is realized in that the primary connector is rotatable relative to the primary mount profile and at least one of the connection assembly and the main wing so as to configure the primary connector and mount profile between an decoupled configuration in which the primary connector may be moved (e.g., directly moved, such as translationally moved and/or moved without rotation relative to the primary mount) into so as to be engaged with, and removed from so as to be disengaged from, the primary mount profile, and a locked configuration in which movement (e.g., translational movement) between the primary mount profile and the primary connector is restricted.

The connection assembly may therefore be mounted relative to the main wing and locked (e.g., anchored) in position by simply turning the primary connector relative to the primary mount profile. This relatively simple action may be able to be performed by a single individual without requiring a team of people to fix the primary connector to the primary mount profile. Further, in rotating the primary connector relative to the primary mount profile, small misalignments (e.g., misalignments arising as a result of the construction of adjacent members, such as the wing box) may be eliminated, where a connection between a screw and a threaded hole would not provide a connection that was flexible enough to account for such misalignments.

The primary mount profile may be defined by a mounting sleeve with a circumferentially extending opening therein. The opening may extend along the axial length of the sleeve (e.g., the full axial length), and the primary connector may comprise an elongate connector. The elongate connector may be a bolt, connection rod, a tie, a screw, or the like. The primary connector may be positionable in the primary mount profile via the circumferential opening therein to engage with the primary mount profile.

The elongate connector may be generally cylindrical in shape, and may comprise an indent (e.g., one single indent) or two circumferentially oppositely disposed indents extending along the axial length of the elongate connector so as to create a region of lower thickness (such as a region of lower diameter) and a region of higher thickness in the elongate connector. The axial length of the circumferentially oppositely disposed indents may be equal to or greater than the axial length of the mounting sleeve.

Along the length of the elongate connector in which the indent exists, the elongate connector may have a profile having the shape of a circle with a removed segment, or two removed segments in the case where two indents are present. As such, the elongate connector may be substantially cylindrical in shape, but may comprise a flat surface along the length of the indent or indents. The width of the indent (i.e., taken in the direction perpendicular to the longitudinal axis of the elongate connector) may be equal to the thickness of the elongate connector in the region of the indent (e.g., the lower thickness).

The shape of the primary connector (e.g., the elongate connector) may permit the primary connector to be easily inserted into a primary mount profile, while providing a high level of resistance to movement relative to the primary mount profile once the primary connector has been configured to the locked configuration.

The width of the opening may be equal to or greater than the region of lower thickness of the elongate connector, but less than the region of higher thickness of the elongate connector. As such, the elongate connector may be able to be easily introduced into the primary mount profile, but difficult to remove once it has been configured to the locked configuration.

In the decoupled configuration, the primary connector may be able to be removed from the primary mount interface by translational movement of the primary connector relative to the primary mount interface alone, for example by translationally moving the primary connector through the circumferentially extending opening in the primary mount interface. However, in the locked confirmation, the primary connector may require to be rotated in order to be removed from the primary mount interface.

The primary connector may be rotatable relative to the connection assembly. Alternatively, the primary connector may be fixed relative to the connection assembly. In this case, relative rotation of the primary connector and the primary mount profile may be effected by rotation of the primary mount profile, which may be rotatable relative to the main wing, for example. In some examples, relative rotation of the primary connector and primary mount profile may be effected by rotation of the connection assembly itself relative to the main wing.

The primary connector may comprise a stopper to engage an axial surface of the primary mount profile to restrict axial movement between the primary connector and the primary mount profile. The stopper may be located on an axially opposite side of the connector to an axial side of the connector that engages the primary mount profile. In some cases, for example where the primary mount profile engages a mid-portion of the primary connector, the primary connector may comprise two stoppers, one located at or towards each end of the primary connector. Having a connector may therefore remove any risk of vibrational or unexpected forces moving the primary connector axially.

The connection assembly may be in the form of a cassette, whereby the connection assembly is generally the shape of a rectangular prism and has solid sides. The cassette form may permit the connection assembly to be more easily attached to the main wing, for example because the shape of the cassette form is predictable and may be more easily handled by a user wishing to install the connection assembly onto the main wing.

At least one of the primary connector and the primary mount profile may comprise a tooling profile to enable engagement with a tool for the purpose of rotating the at least one of the primary connector and the primary mount profile about an axis of rotation. The tooling profile may enable rotation of the primary connector relative to the mount profile by hand, for example using fingers, or using a tool such as a screwdriver or Allen key.

The primary connector may comprise or define a longitudinal axis, and the primary mount profile may comprise or define a longitudinal axis. The primary connector may be configurable to engage with the primary mount profile such that the longitudinal axis of the primary mount profile may be coincident with the longitudinal axis of the primary connector. At least one of the primary mount profile and the primary connector may be configurable to rotate about its longitudinal axis. As such, the primary connector may easily rotate about its axis within the primary mount profile.

The connection assembly may comprise a connection structure, and the connection structure may comprise the primary and secondary connector. The connection structure may additionally or alternatively support other components of the connection assembly, such as the slat track, roller bearing, and the like.

The connection assembly (e.g., the connection structure) may comprise a first set of a primary connector and a primary mount profile located on one side thereof and a second set of a primary connector and a primary mount profile located on a second side thereof. As such, two sides (e.g., both lateral sides extending away from the main wing, or the wing box thereof) of the connection assembly (e.g., the connection structure) may be able to be mounted to the main wing. The connection assembly (e.g., the connection structure) may be mounted to a support provided on the main wing, such as a rib or ribs (e.g., two ribs) that may protrude from the wing box. The connection assembly (e.g., the connection structure) may be mounted to the main wing via a support member that may be connected to the main wing, e.g., to a spar (e.g., a front spar) of the main wing.

The primary connector and the secondary connector may be of the same type (e.g., be identical, have the same geometric form, be constructed from the same material, and the like), and the primary mount profile and the secondary mount profile are of the same type (e.g., be identical, have the same geometric form, be constructed from the same material, and the like). This may ease the process of fastening the high lift assembly (e.g., the connection assembly) to the main wing be reducing the number of components that are required in order to complete the process.

The primary connector and the secondary connector may be of different types, and the primary mount profile and the secondary mount profile are of different types. A type of primary and/or secondary connector may be an elongate member, such as a bolt, a rod, or the like, or may be a tie, a pad, or the like.

A further aspect relates to a high lift assembly for the wing according to the preceding aspect, comprising a high lift body comprising a high lift structure and a connection assembly comprising a slat track that is configurable to be mounted to the main wing via a roller bearing such that the slat track movably connects the high lift body to the main wing such that the high lift body is movable between a retracted position and at least one extended position. The connection assembly additionally comprises a primary connector and a secondary connector, and a primary mount profile and a secondary mount profile each configured to be connected to the main wing (e.g., prior to mounting the primary and secondary connectors to the primary and secondary mount profiles). The primary connector is configurable to be mounted to a main wing via a primary mount profile (e.g., which may already be connected to the wing) and the secondary connector is configurable to be mounted to the main wing via a secondary mount profile (e.g., which may already be connected to the wing), wherein the primary connector is configurable to engage the primary mount profile, and the secondary connector is configurable to engage the secondary mount profile. The primary connector is rotatable relative to the primary mount profile and at least one of the connection assembly and the main wing so as to configure the primary connector and mount profile between a decoupled configuration in which the primary connector may be moved into so as to be engaged with, and removed from so as to be disengaged from, the primary mount profile, and a locked configuration in which movement between the primary connector and the primary mount profile is restricted.

A third aspect relates to a method for connecting a high lift assembly to a wing for an aircraft according the previous aspect. The method comprises preassembling the wing for an aircraft, rotating the primary connector relative to the primary mount profile such that the primary connector and mount profile are in the engaging configuration, engaging the primary connector and the primary mount profile, rotating the primary connector relative to the primary mount profile so as to configure the primary connector and the primary mount profile to the locked configuration, and connecting the secondary connector to the secondary mount profile so as to restrict movement between the connection assembly and the main wing.

The method may comprise configuring the primary connector and the primary mount profile to the locked configuration before connecting the secondary connector to the secondary mount profile.

A fourth aspect relates to an aircraft comprising a wing according to the first aspect.

DETAILED DESCRIPTION OF THE PREFERRED EMBODIMENTS

Figure 1:
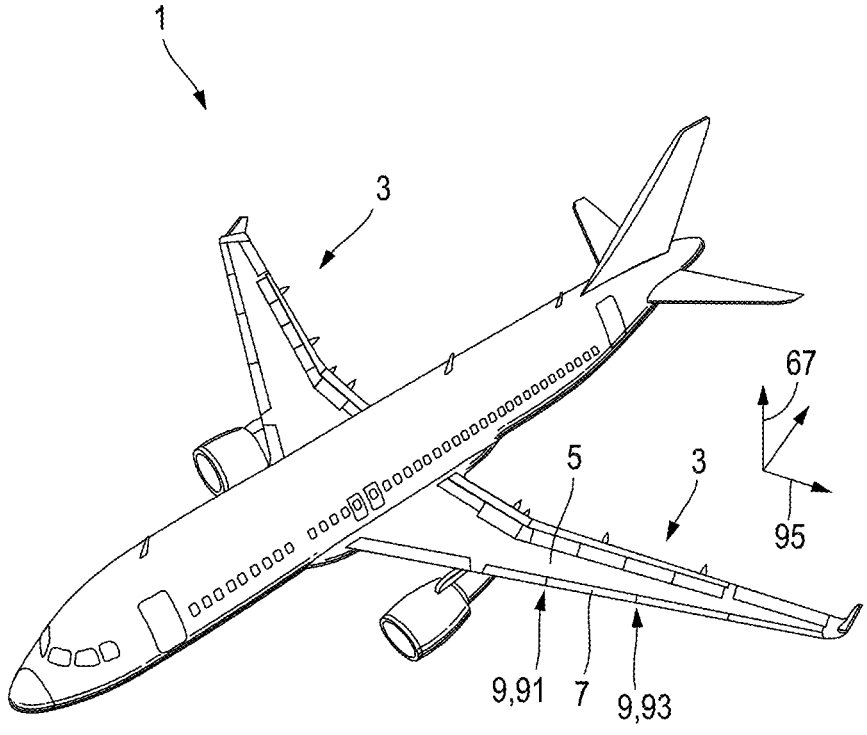
FIG. 1 is a perspective view of an aircraft, showing a wing of the aircraft.

In FIG. 1 an aircraft 1 according to an embodiment of the present invention is illustrated. The aircraft 1 comprises a wing 3 that is formed according to an embodiment of the present invention.

As shown in FIG. 1, the connection assembly 9 relates to a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91. Additionally illustrated in FIG. 1 is a wing thickness direction 67. While, in FIG. 1, the connection assembly 9 is illustrated as connecting a slat 7 to the main wing 5, it should also be understood that the connection assembly 9 may be used to connect a trailing edge flap 2 to the wing 5 of an aircraft.

Figure 2:
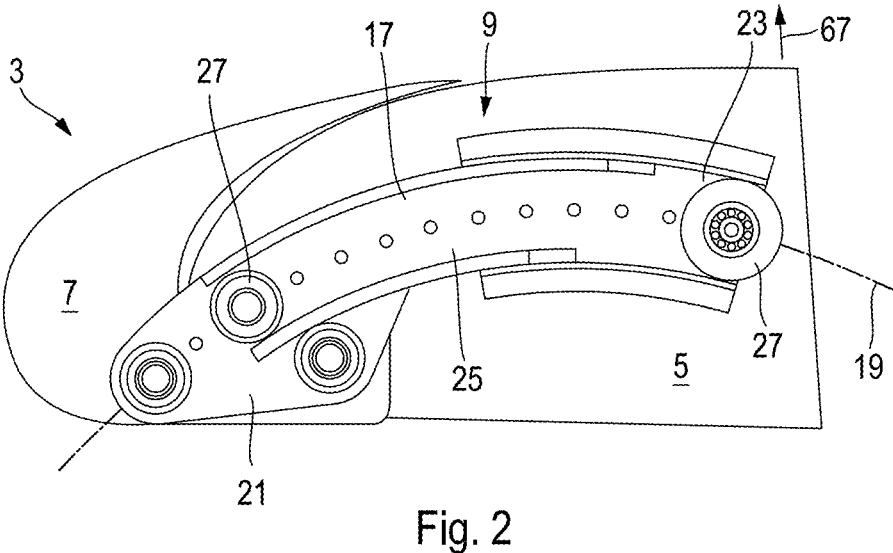
FIG. 2 is a schematic view of a connection assembly in an aircraft.

FIG. 2 shows an example of a connection assembly 9 of a wing for an aircraft, which is configured to connect a slat to the main wing of an aircraft. The connection assembly 9 may be used in combination with a wing 1 similar to that as described in FIG. 1, where the wing 1 comprises a main wing 5, a slat 7, and a connection assembly 9 (according to the present disclosure) movably connecting the slat 7 to the main wing 5, such that the slat 7 is movable between a retracted position and at least one extended position.

In FIG. 2, the connection assembly 9 comprises a slat track 17 that extends along a track longitudinal axis 19 between a front end 21 and a rear end 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19.

Figure 3:
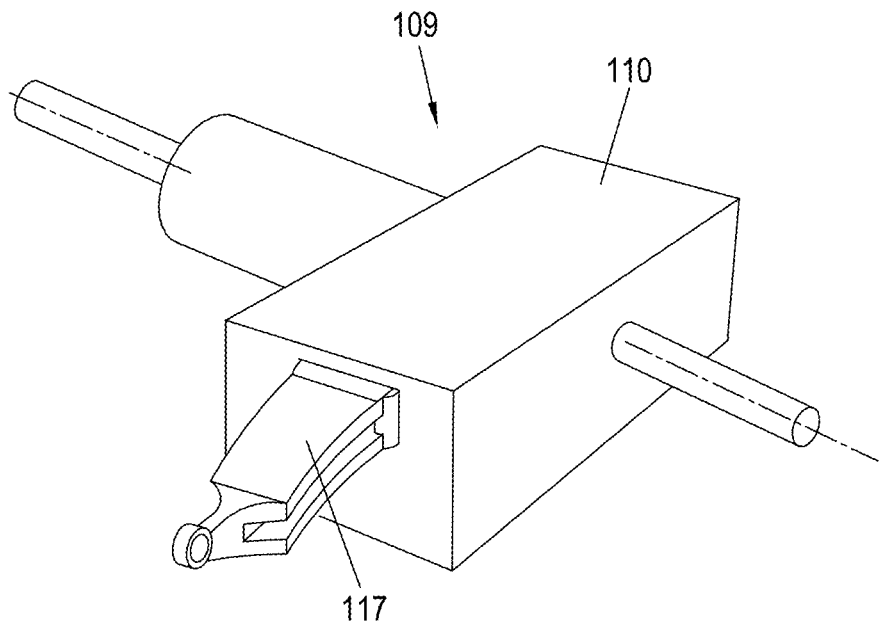
FIG. 3 is a schematic view of a connection assembly cassette.

An alternative connection assembly 109 is illustrated in FIG. 3, this time in the form of a connection assembly cassette. Here, the slat track 117 is partially located inside a cassette housing 110, and the roller bearing on which the slat track 117 is located completely in the housing 110. In order to move the slat track 117 between an extended and a retracted position, an actuator or actuators are provided that penetrate the cassette housing 110 and permit movement of the slat track 117.

Figure 4A:
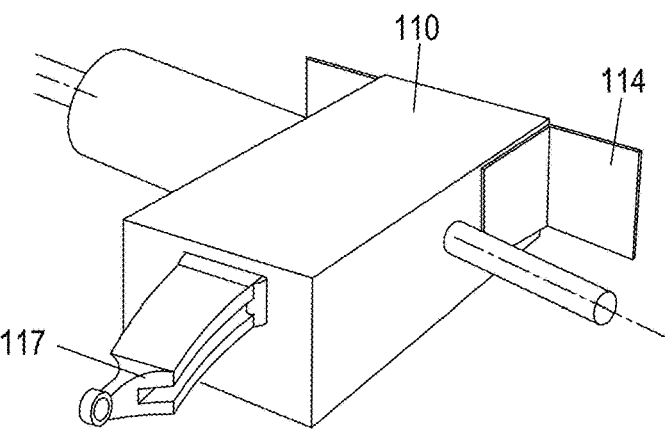
FIGS. 4A-C provide views of a connection assembly cassette mounted to an aircraft wing.
Figure 4B:
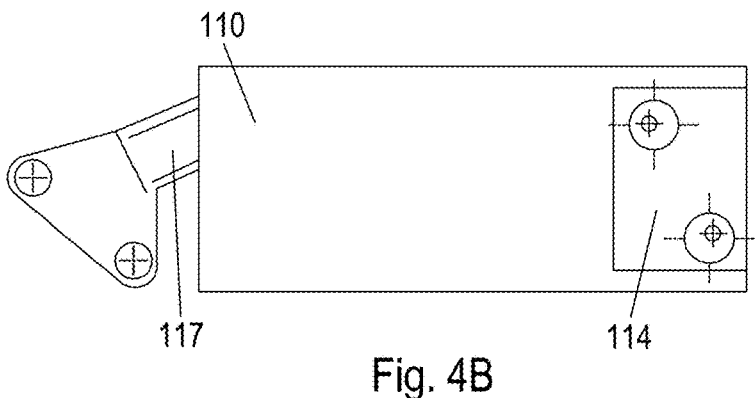
Figure 4C:
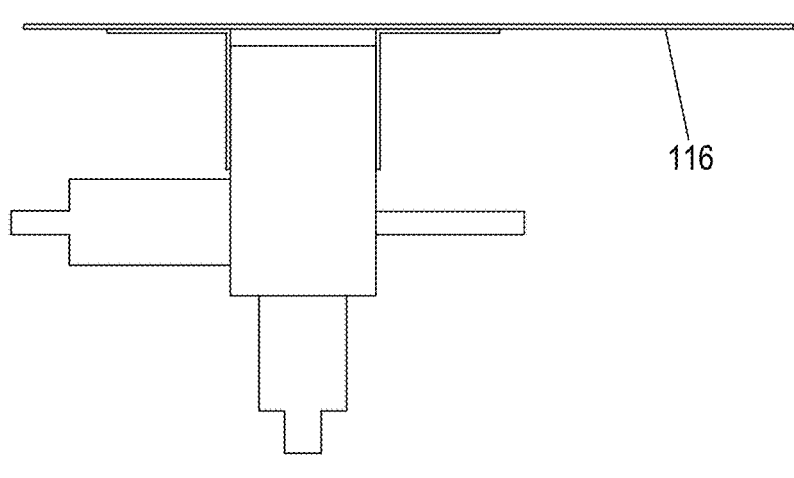

In both the case of the connection assembly 9, 109 having an "open" construction as shown in FIG. 2, or a "cassette" construction as is shown in FIG. 3, the connection assembly may be mounted to the main wing of an aircraft via a mounting arrangement. One example of a mounting arrangement 114 is illustrated in FIG. 4A. Here, a cassette housing 110 is mounted to a main wing 116 of an aircraft via the mounting arrangement 114. The mounting arrangement 114 is in the form of a bracket, which comprises a number of locations at which the bracket is connected to the cassette 110, for example via a known connector. In this example, the main wing 116 (and, in particular, the wing box of the main wing) has been constructed at the same time as the cassette 110 was mounted thereon. This has the effect of permitting the orientation of the cassette 110 relative to the main wing 116 to be adapted such that the slat track 117 is at the desired angle relative to the main wing 116. The exact orientation required by the connection assembly 9, 109 relative to the main wing may change slightly depending on the exact connection assembly 9, 109, for example due to manufacturing tolerances during the production of the aircraft wing, the main wing (including the wing box) and/or the connection assembly itself. Therefore, at present it is important to ensure that the connection assembly 9, 109 is adequately oriented relative to the main wing 116 during production thereof.

While the desire to modularize the production of an aircraft provides advantages in terms of more efficient production, as well as improved processes for the repair and replacement of aircraft parts, it has the effect that the already assembled (e.g., preassembled) parts are not able to be adjusted to account for slight anomalies in the dimensions of parts (e.g., of a connection assembly) so as to accurately orient those parts relative to the preassembled structure.

FIGS. 5A to 5D show a connection assembly 209 comprising a primary connector 212 and a primary mount profile 214. An arrow 215 indicating a direction of motion of the connection assembly 209 relative to the primary mount profile 214 is illustrated, such that the primary connector 212 may be engaged with the mount profile 214 (here, by moving the primary connector 212 into a recess defined by the primary mount profile 214). The primary connector 212 is the shape of a cylinder that protrudes from a connection structure 218 of the connection assembly 209, in this example having a longitudinal axis that is located perpendicular to the surface of the connection structure 218. In addition, a segment has been removed from the otherwise cylindrical primary connector 212 such that the cylindrical primary connector 212 has a flat surface 216, and a reduced diameter in the direction perpendicular to the flat surface 216. The diameter in the direction parallel to the flat surface 216 is the full diameter of the cylindrical connector 212.

Figure 5A:
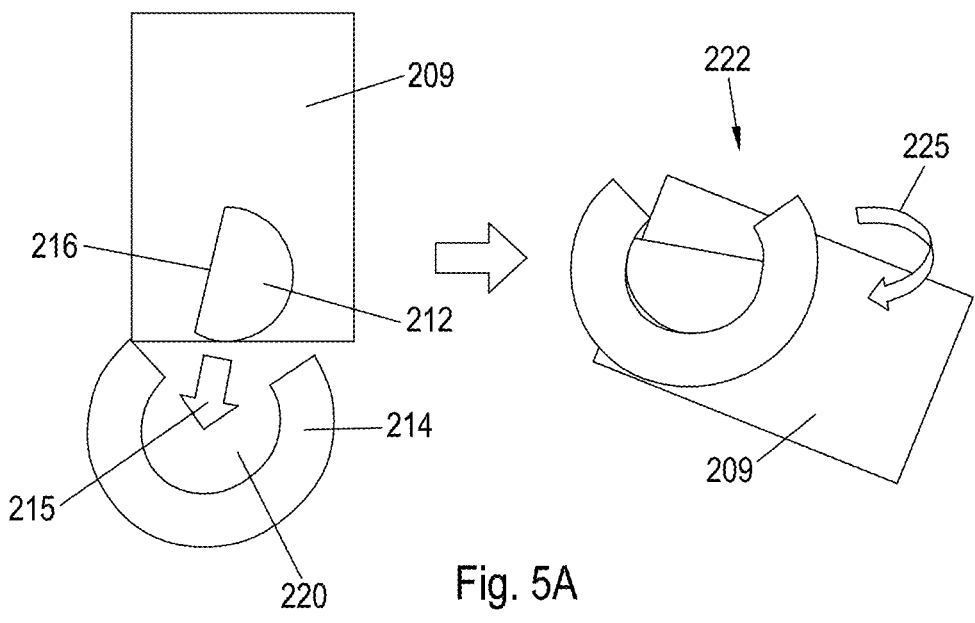
FIGS. 5A-D illustrate a connector of a connection assembly being installed into a mount profile.

The primary mount profile 214 is also illustrated in FIG. 5A. Here, the mount profile is also generally cylindrical in form, and has a recess 220 defined in the middle thereof, such that the primary mount profile 214 is in the form of a sleeve. A circumferential opening 222 is present, that in this example extends the entire axial length of the primary mount profile 214, to permit the primary connector 212 to be guided into the recess 220 in the primary mount profile 214 through the opening 222.

In the example of FIGS. 5A to 5D, the primary connector 212 is turned such that the flat surface 216 is located parallel to the direction of motion illustrated by the arrow 215 such that the reduced diameter of the primary connector 212 is able to be guided through the opening 222. The reduced diameter is therefore smaller than the length of the circumferential opening. Once the primary connector 212 has been positioned in the opening, but no rotation between the primary connector 212 and the primary mount profile 214 has yet been effected, the primary connector 212 and the primary mount profile 214 may be considered to be in the decoupled configuration.

As illustrated in FIG. 5A, the primary connector may then be turned (as illustrated by arrow 225), (in this example by approximately 90 degrees) such that the flat surface 216 is facing the opening and may be perpendicular or obliquely oriented relative to the direction of motion defined by the arrow 215. In this orientation, movement of the primary connector 212 in the reverse direction of the arrow 215 would not be possible, since the full (larger) diameter of the primary connector 212 is aligned with the opening 222 of the primary mount profile 214, which has a smaller width than the full (larger) diameter of the primary connector 212. In this configuration, the primary connector 212 and the primary mount profile 214 may be considered to be in the locked configuration.

It should be noted that in the configuration shown in FIG. 5A, the primary connector 212 is fixed relative to the connection assembly 209 such that rotational movement therebetween is not enabled. The primary mount profile 214 may be mounted on a structural support of the main wing of an aircraft, such as a rib protruding from the wing box, a win spar, or the like.

Figure 5B:
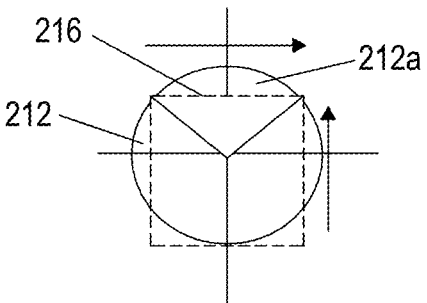
Figure 5C:
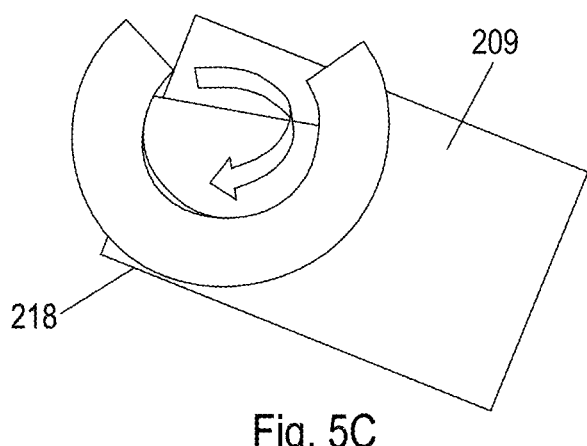

In contrast, FIG. 5C illustrates an example whereby the primary connector 212 is rotatable relative to the connection assembly 209. Here, the connection assembly 209 may therefore not require to be rotated in order to configure the primary connector 212 and the primary mount profile 214 to the locked configuration.

In FIG. 5B, further detail as to how to dimension the primary connector 212 is illustrated. Here, one design of acceptable primary connector 212 is illustrated in which the width of the flat surface (perpendicular to the longitudinal axis of the primary connector 212) is equal to the reduced diameter of the primary connector 212 as a result of removing the segment 212a so as to produce the flat surface 216. When used with a primary mount profile 214, such a dimension of the primary connector 212 may permit the opening 222 to be dimensioned such that the primary connector 212 is easily positionable in the recess 220, while also securely locking the primary connector 212 in the mount profile 214.

Figure 5D:
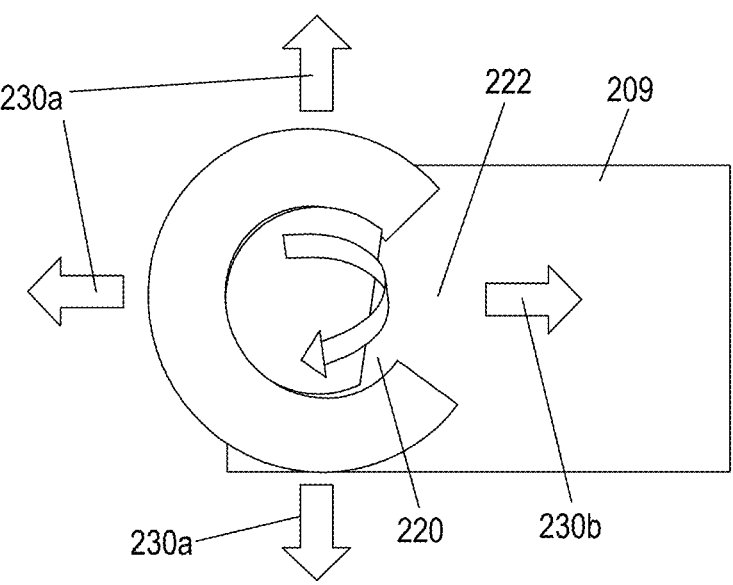

FIG. 5D is a further illustration of the connection assembly 209 shown in FIG. 5C, with arrows 230a, 230b illustrating the forces that may be applied to the primary connector 212 relative to the primary mount profile 214. Forces in the direction of arrows 230a involve forcing the connector 220 into the primary mount profile 214, while forces in the direction of arrow 230b involve forcing the connector 220 in the direction of the opening 222. To avoid unintended ejection of the primary connector 212 form the recess 220, it is desirable to have forces in the direction of arrows 230a, while forces in the direction of arrow 230b should be avoided. As such, the opening of the primary mount profile 214 may be positioned relative to the connection assembly so as to minimize forces in the direction of arrow 230b, for example the opening 222 may be positioned towards the location of the high lift body and/or the leading edge of the aircraft wing.

Figure 6:
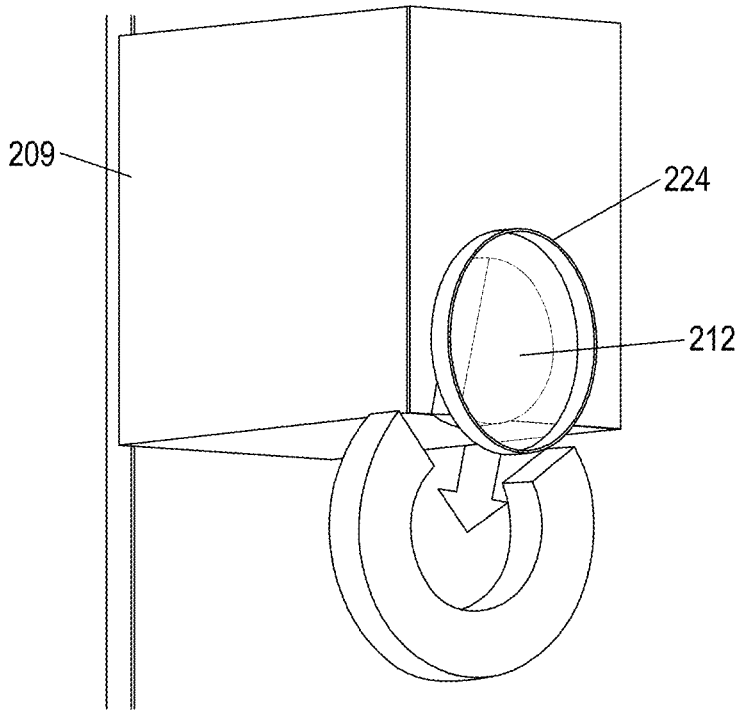
FIG. 6 is an alternative example of a connector being installed into a mount profile.

In FIG. 6 there is illustrated a primary connector 212 having a stopper 224 disposed thereon. The stopper 224 is disposed at an axial end of the primary connector 212, and assists to prevent or restrict axial movement of the primary connector 212 relative to the primary mount profile 214, thereby preventing the primary mount profile 214 from becoming disengaged from the primary connector 212 as a result of axial movement thereof.

Figure 7A:
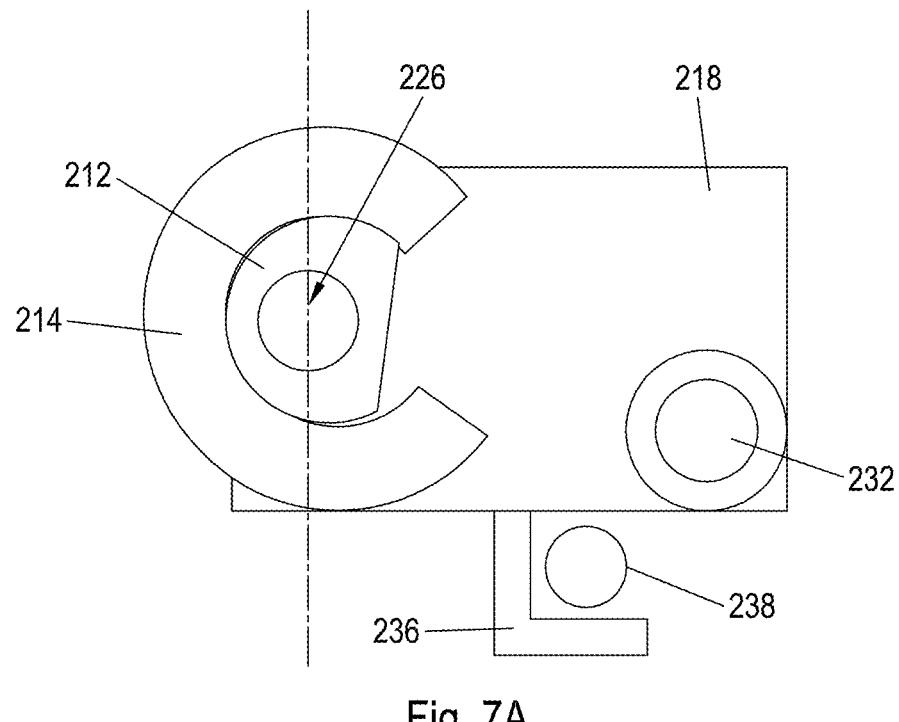
FIGS. 7A-B show a further alternative example of a connector installed in a mount profile.
Figure 7B:
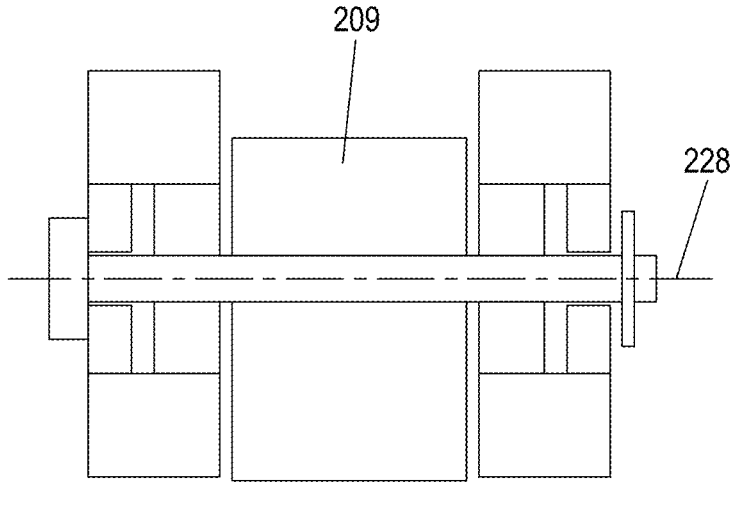

FIGS. 7A and 7B illustrate a further example of a connection assembly comprising a primary connector 212 and a primary mount profile 214. Here, the primary connector 212 and the primary mount profile 214 are illustrated in the locked configuration. While in previous Figures, the primary connector 212 was illustrated as being either integrally formed with the connection structure 218 of the connection assembly 209 or fastened via e.g., welding, chemical bonding, or the like, in this example the primary connector 212 is bolted to the connection assembly via a bolt (or similar elongate connector) 226. Rotation of the primary connector 212 about the longitudinal axis 228 of the bolt 226 may be possible, and the bolt may be held in place by a nut or fastener. In FIG. 7A, a secondary connector 232 is also illustrated. The secondary connector 232 may also be or comprise an elongate connector and may extend through an aperture in the connection structure 218 to be held in place by a nut or fastener, may comprise a thread and be connected to a threaded bore on or defined by the connection structure 218, or the like.

In FIG. 7B, it can be seen that the bolt 226 extends fully through the connection structure 218, which may provide safety advantages, as a more secure connection between the primary connector 212 may be realized. Also visible in FIG. 7B is that the connection assembly 209 comprises a primary connector 232 on each lateral side thereof, while a primary mount profile 214 is also located on each lateral side thereof. As such, the connection assembly 209 may be connected to the main wing at two points thereof, and, in particular, at two points on lateral surfaces of the connection structure 218 thereof.

Finally, the connection assembly 209 may comprise a catcher 238 and a corresponding catcher arm 236. The purpose of the catcher may be to prevent or restrict motion of the primary connector 212 and the connection assembly 209 in the direction of the arrow 230b, should the primary connector 212 fail in some way. This is therefore another possible safety feature of the connection assembly 209.

Figure 8A:
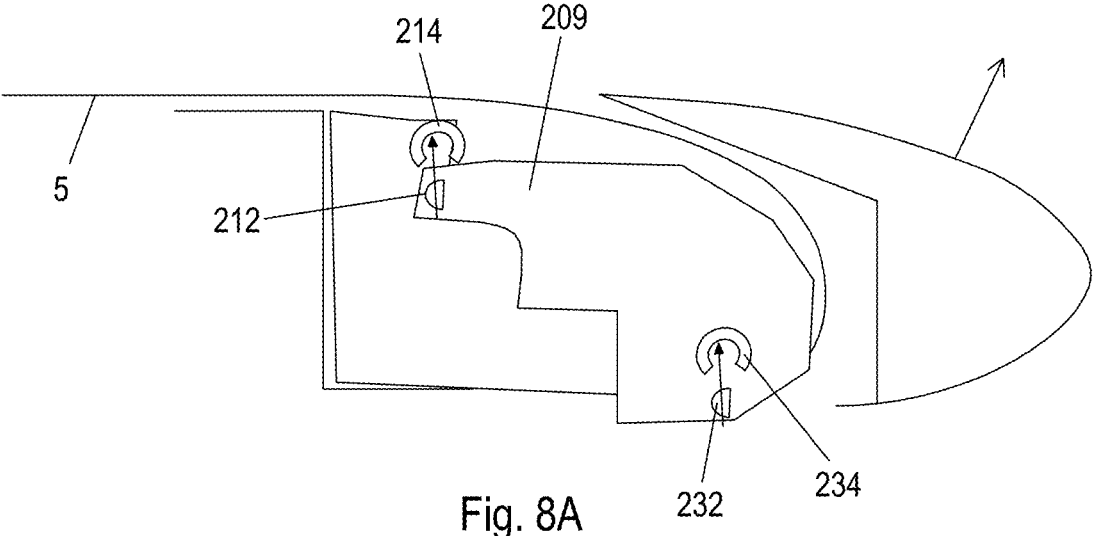
FIGS. 8A-C show alternative examples of a connection assembly connected to a main wing.
Figure 8B:
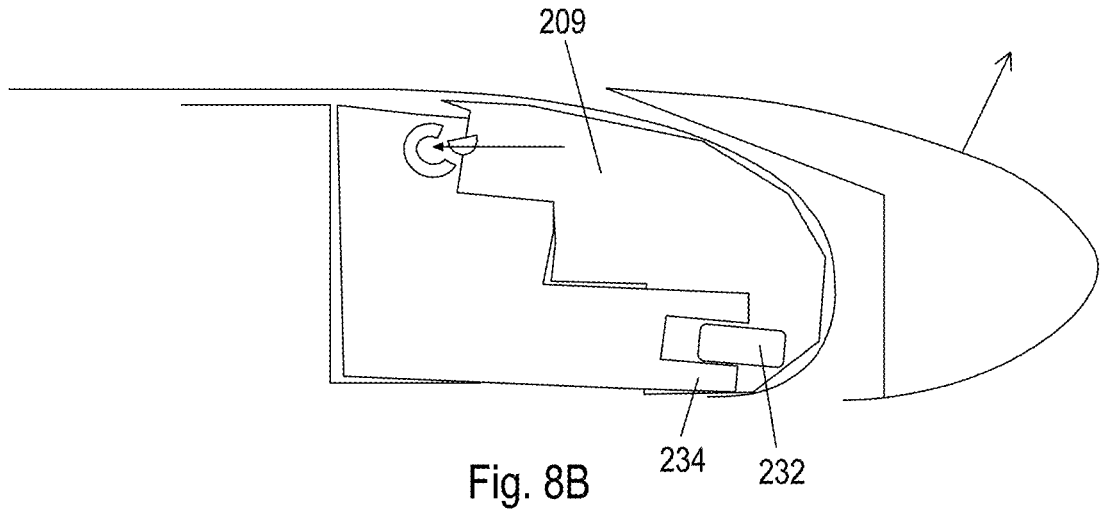
Figure 8C:
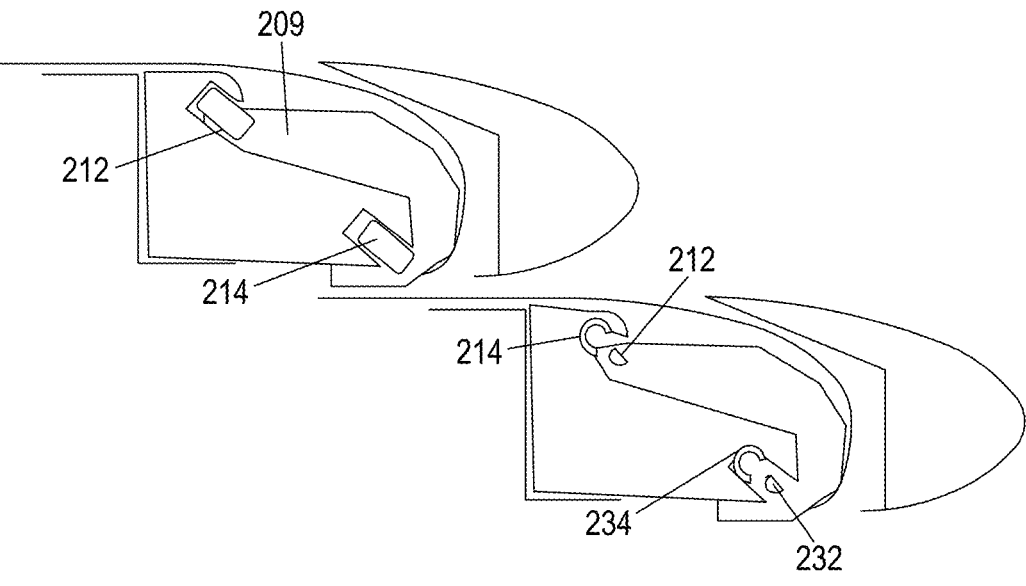

In FIGS. 8A to 8C, there is illustrated a connection assembly 209 in the process of being connected to (e.g., installed on) a main wing 5. In FIG. 8a, the connection assembly 209 comprises a primary connector 212 and a secondary connector 232, and a primary and secondary mount profile 214, 234. Here, the primary and secondary connectors 212, 232 are of the same form. The primary and secondary mount profiles 214, 234 are each connected (e.g., rotatably connected) onto a bracket, which may be connected to a spar of the wing, or may be connected onto a support structure (e.g., rib) protruding from the main wing (e.g., from the wing box). In this case, both the primary and secondary connectors 212, 232 may be rotated (or both the primary and secondary mount profiles 214, 234 may be rotated) such that the connectors 212, 232 may be insertable into the recesses 220 of the primary and secondary mount profiles 214, 234. Here, the connection assembly is being moved vertically in relation to the orientation of the main wing 5 when the aircraft is on the ground.

In the case of FIG. 8B, there is illustrated a connection assembly 209 being moved horizontally with respect to the main wing when the aircraft is located on the ground. Here, the secondary connector 232 is in the form of a connection pad which may slide into a secondary mount profile 234 which is defined by a bracket or support structure (e.g., rib) of the main wing of the aircraft. The pad may fulfil the function of preventing rotation of the connection assembly, in particular about the primary connector, which may release the connection between the primary connector and mount profile unexpectedly.

FIG. 8C shows a further example of a connection assembly 209 engaging a main wing (e.g., a bracket connected to a main wing). Here, two sides of a connection assembly are shown. On one side, a primary connector 212 and primary mount profile 214 are shown, with the secondary connector and secondary mount profile 232, 234 being identical on that side of the connection assembly 209. On the opposite lateral side of the connection assembly, the both the primary and secondary connectors 212, 232 are in the form of connection pads. The described connection pads may not be able to be rotated (e.g., may be fixed relative to the connection assembly 209 and may simply fit into a recess defined in the main wing 5.

Figure 9A:
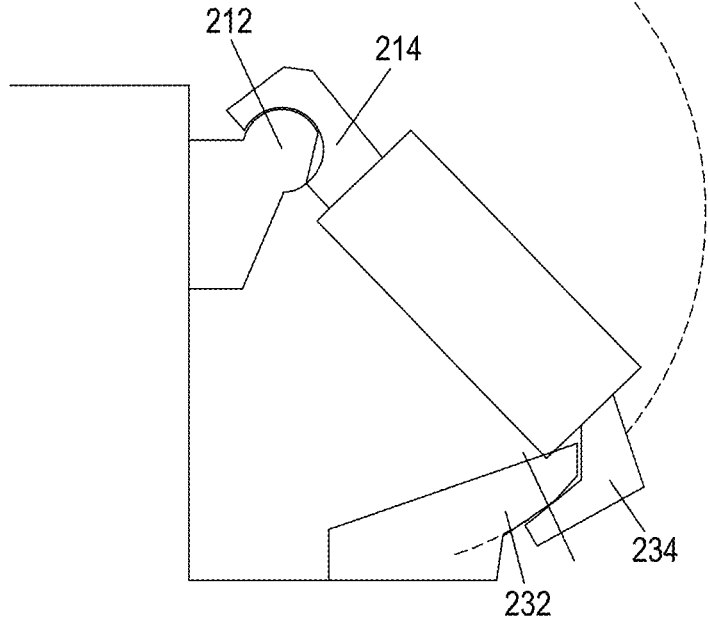
FIGS. 9A-E provide alternative connection means to a main wing.
Figure 9B:
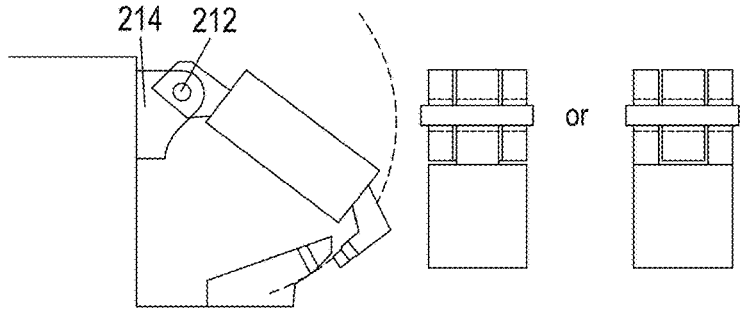
Figure 9C:
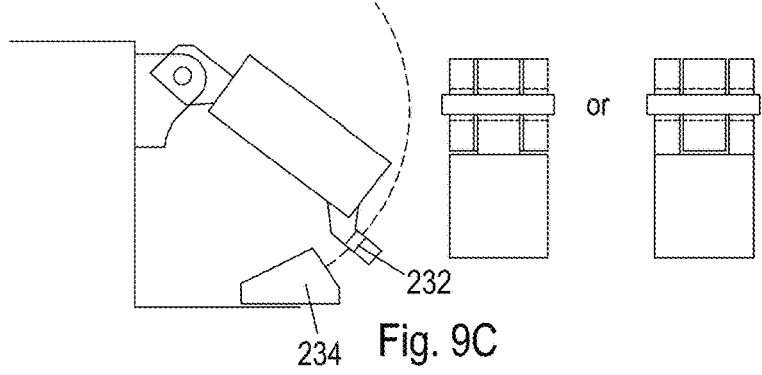
Figure 9D:
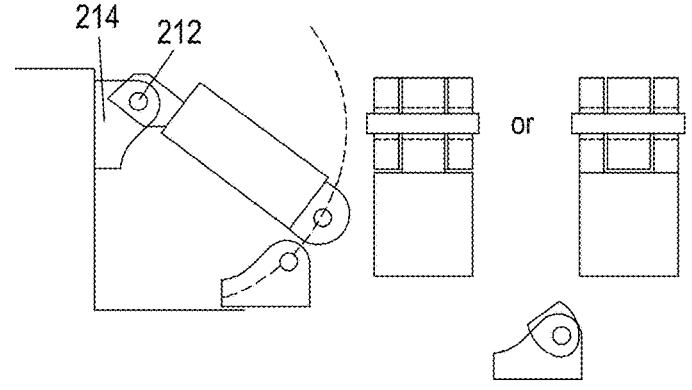
Figure 9E:
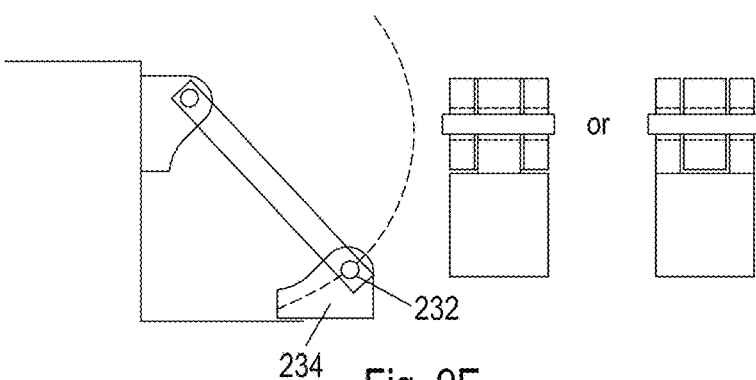

In FIGS. 9A to 9E, alternative connection concepts are shown. FIG. 9A illustrates a concept whereby the primary connector 212 is the shape of a sphere with a segment removed therefrom similar as has previously been described. Primary mount profile 214 is in the form of a socket 214 which may receive the sphere and be rotatable thereabout. The secondary mount profile 234 and secondary connector 212 may be simply in the form of two flanges which may be connected together by a screw, for example.

FIGS. 9B to 9E illustrate further such connection concepts. Here, the primary connector may simply be in the form of a bolt through a flange (primary mount profile 214), and the secondary connector and secondary mount profile 232, 234 may be similar. In each case, it should be noted that connection of the primary connector 212 to the primary mount profile 214 permits rotation about a central axis of the primary connector 212, while fastening of the secondary connector 232 to the secondary mount profile 234 may prevent or restrict this rotational motion. Generally, this concept may permit the connection assembly 209 to be easily moved to a desired position or orientation (e.g., relative to the main wing 5).

FIGS. 10A to 10D show perspective views of a connection between a high lift assembly comprising a connection assembly 209 and a high lift body 206. Here, the primary connector 212 is in the form of an elongate connector having two oppositely (e.g., diametrically) disposed indents 240 that extend along the length of the elongate connector. The oppositely disposed indents 240 have the effect of creating a longitudinally extending region of reduced thickness in the direction perpendicular to the flat longitudinally extending surface formed by the indents. In addition, the elongate connector comprises a stopper 224 at one end thereof, which in this case comprises an indicator 242 in the form of a protrusion. Additionally, the elongate connector comprises a tooling profile 244 (in this case in the form of a hexagonal indent, for example for an Allen key) which may be used to permit the elongate connector to be turned around an axis 246 so as to configure the primary connector 212 and the primary mount profile 214 between the decoupled configuration and the locked configuration.

Figure 10A:
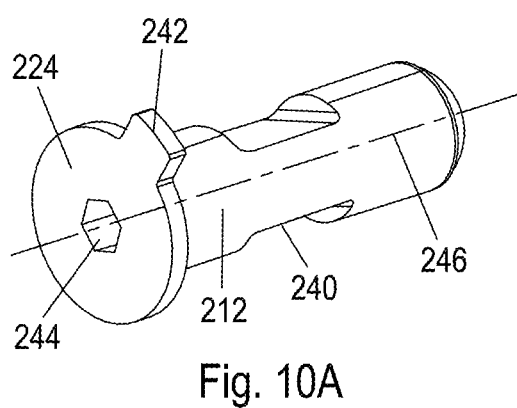
FIGS. 10A-D are perspective views of a connection between a high lift assembly and a main wing.
Figure 10B:
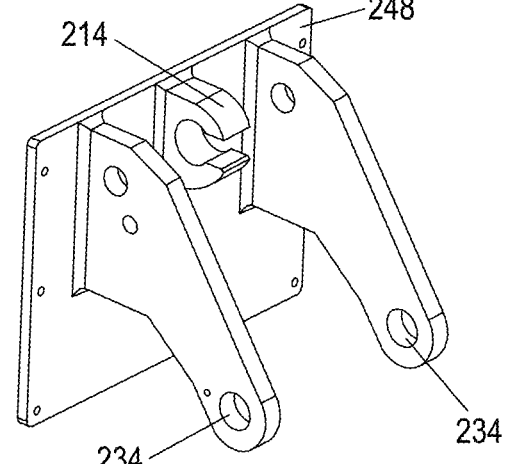

Shown in FIG. 10B is a bracket 248, which may be mounted to the main wing (e.g., the front spar) of an aircraft. The bracket 248 in this case defines a primary mount profile 214 and two secondary mount profiles 234, which correspond to each lateral side of the connection assembly 209 illustrated in FIGS. 10C and 10D. As in the previously illustrated Figures, the primary mount profile 214 is in the form of a cylindrical sleeve (in this case, integrally formed with a back panel of the bracket 248) comprising a circumferential opening extending along the length of the primary mount profile.

Figure 10C:
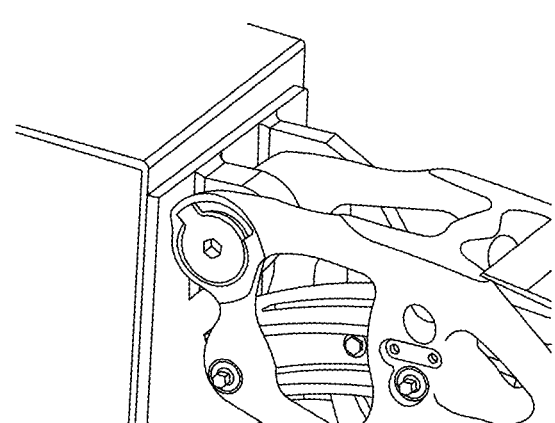
Figure 10D:
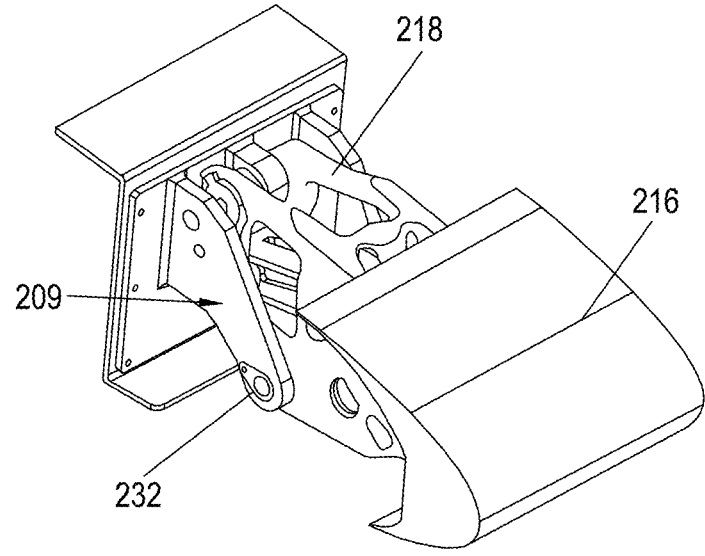

In this case, the connection structure 218 may surround and support other components of the connection assembly 209 such as the slat track, as can be seen in FIGS. 10C and 10D. this may enable a lighter construction that is more easily able to be produced in a desired shape.

In use, the primary connector 212 may be coupled to the connection structure 218 (e.g., by bores in the structure), and then the region of reduced thickness of the primary connector may be aligned with the opening in the primary mounting member 214 so as to permit insertion of the primary connector 212 in the recess formed by the primary mounting member 214. When inserted and in the decoupled configuration, the indicator 242 points to a known position indicating that the primary connector and mount profile are in the decoupled configuration. The connector 212 may then be turned (in this example anti-clockwise) around the axis 246 of the connector so as to change the primary connector 212 and mount profile 214 to the locked configuration, thereby preventing removal of the primary connector 212 from the mount profile 214 without turning of the connector 212.

Finally, in order to prevent rotation of the connection assembly 209 about the axis 246 of the primary connector 212, both secondary connectors may be fastened to the connection structure via secondary mount profiles provided on the bracket 248. The secondary connectors 232 may be elongate and positioned through a bore in the connection structure so as to connect the connection structure 218 thereto and prevent rotation of the connection structure about the axis 246.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a main wing; and
a high lift assembly comprising:
  a high lift body comprising a high lift structure; and
  a connection assembly comprising a slat track that is movable in relation to the main wing and a roller bearing that movably connects the high lift body to the main wing, such that the high lift body is movable between a retracted position and at least one extended position, and the connection assembly comprises a primary connector and a secondary connector,
wherein the primary connector is mounted to the main wing via a primary mount profile and the secondary connector is mounted to the main wing via a secondary mount profile,
wherein the primary connector is configurable to engage the primary mount profile, and the secondary connector is configurable to engage the secondary mount profile,
wherein the primary connector is rotatable relative to the primary mount profile and at least one of the connection assembly and the main wing so as to configure the primary connector and mount profile between a decoupled configuration in which the primary connector may be moved into so as to be engaged with, and removed from so as to be disengaged from, the primary mount profile, and a locked configuration in which movement between the primary connector and the primary mount profile is restricted.

2. A wing for an aircraft, comprising:
a main wing; and
a high lift assembly comprising:
  a high lift body comprising a high lift structure; and a connection assembly comprising a slat track and a roller bearing that movably connects the high lift body to the main wing, such that the high lift body is movable between a retracted position and at least one extended position, and the connection assembly comprises a primary connector and a secondary connector,
wherein the primary connector is mounted to the main wing via a primary mount profile and the secondary connector is mounted to the main wing via a secondary mount profile,
wherein the primary connector is configurable to engage the primary mount profile, and the secondary connector is configurable to engage the secondary mount profile,
wherein the primary connector is rotatable relative to the primary mount profile and at least one of the connection assembly and the main wing so as to configure the primary connector and mount profile between a decoupled configuration in which the primary connector may be moved into so as to be engaged with, and removed from so as to be disengaged from, the primary mount profile, and a locked configuration in which movement between the primary connector and the primary mount profile is restricted,
wherein the primary mount profile is defined by a mounting sleeve with a circumferentially extending opening therein, and the primary connector comprises an elongate connector, and
wherein the primary connector is positionable in the primary mount profile via the circumferential opening to engage with the primary mount profile.

3. The wing for an aircraft according to claim 2, wherein the elongate connector is generally cylindrical in shape, and comprises two circumferentially oppositely disposed indents extending along an axial length of the elongate connector so as to create a region of lower thickness and a region of higher thickness in the elongate connector, and
wherein the axial length of the circumferentially oppositely disposed indents is equal to or greater than the axial length of the mounting sleeve.

4. The wing for an aircraft according to claim 3, wherein a width of the opening is equal to or greater than the region of lower thickness of the elongate connector, but less than the region of higher thickness of the elongate connector.

5. The wing for an aircraft according to claim 1, wherein the primary connector is rotatable relative to the connection assembly.

6. The wing for an aircraft according to claim 1, wherein the primary connector comprises a stopper to engage an axial surface of the primary mount profile to restrict axial movement between the primary connector and the primary mount profile.

7. The wing for an aircraft according to claim 1, wherein the connection assembly comprises a connection structure comprising the primary and secondary connector.

8. The wing for an aircraft according to claim 1, wherein at least one of the primary connector and the primary mount profile comprise a tooling profile to enable engagement with a tool in order to rotate the at least one of the primary connector and the primary mount profile about an axis of rotation.

9. A wing for an aircraft, comprising:
a main wing; and
a high lift assembly comprising:
  a high lift body comprising a high lift structure; and a connection assembly comprising a slat track and a roller bearing that movably connects the high lift body to the main wing, such that the high lift body is movable between a retracted position and at least one extended position, and the connection assembly comprises a primary connector and a secondary connector, wherein the primary connector is mounted to the main wing via a primary mount profile and the secondary connector is mounted to the main wing via a secondary mount profile, wherein the primary connector is configurable to engage the primary mount profile, and the secondary connector is configurable to engage the secondary mount profile, wherein the primary connector is rotatable relative to the primary mount profile and at least one of the connection assembly and the main wing so as to configure the primary connector and mount profile between a decoupled configuration in which the primary connector may be moved into so as to be engaged with, and removed from so as to be disengaged from, the primary mount profile, and a locked configuration in which movement between the primary connector and the primary mount profile is restricted, wherein the primary connector comprises a longitudinal axis, and the primary mount profile comprises a longitudinal axis, wherein the primary connector is configurable to engage with the primary mount profile such that the longitudinal axis of the primary mount profile is coincident with the longitudinal axis of the primary connector, and at least one of the primary mount profile and the primary connector is configurable to rotate about its longitudinal axis.

10. The wing of an aircraft according to claim 1, wherein the connection assembly comprises a first set of a primary connector and a primary mount profile located on one side thereof and a second set of a primary connector and a primary mount profile located on a second side thereof.

11. The wing of an aircraft according to claim 1, wherein the primary connector and the secondary connector are of different types, and the primary mount profile and the secondary mount profile are of different types.

12. A high lift assembly for the wing according to claim 1, comprising:

a high lift body comprising a high lift structure; and a connection assembly comprising a slat track that is configurable to be mounted to the main wing via a roller bearing such that the slat track is movable in relation to the main wing and movably connects the high lift body to the main wing such that the high lift body is movable between a retracted position and at least one extended position, the connection assembly additionally comprising a primary connector and a secondary connector, and a primary mount profile and a secondary mount profile each configured to be connected to the main wing;

wherein the primary connector is configurable to be mounted to a main wing via a primary mount profile and the secondary connector is configurable to be mounted to the main wing via a secondary mount profile, wherein the primary connector is configurable to engage the primary mount profile, and the secondary connector is configurable to engage the secondary mount profile, and wherein the primary connector is rotatable relative to the primary mount profile and at least one of the connection assembly and the main wing so as to configure the primary connector and mount profile between a decoupled configuration in which the primary connector may be moved into so as to be engaged with, and removed from so as to be disengaged from, the primary mount profile, and a locked configuration in which movement between the primary connector and the primary mount profile is restricted.

13. A method for connecting a connection assembly to a wing for an aircraft according to claim 1, comprising:

preassembling the wing for the aircraft;

rotating the primary connector relative to the primary mount profile such that the primary connector and mount profile are in an engaging configuration;

engaging the primary connector and the primary mount profile;

rotating the primary connector relative to the primary mount profile so as to configure the primary connector and the primary mount profile to the locked configuration;

connecting the secondary connector to the primary mount profile so as to restrict movement between the connection assembly and the main wing.

14. The method according to claim 13, wherein the primary connector and the primary mount profile are configured to the locked configuration before connecting the secondary connector to the primary mount profile.

15. An aircraft comprising a wing according to claim 1.

* * * * *